United States Patent Office 3,840,516
Patented Oct. 8, 1974

3,840,516
BIOLOGICALLY ACTIVE SUBSTANCE, PEPSTATIN AND PRODUCTION PROCESSES THEREOF
Hamao Umezawa and Tomio Takeuchi, Tokyo, Takaaki Aoyagi, Fujisawa, and Masa Hamada, Kenji Maeda, and Yoshiro Okami, Tokyo, Japan, assignors to Zaidan Hojin Biseibutsu Kagaku Kenkyu Kai, Tokyo, Japan
Original application May 14, 1970, Ser. No. 37,165, now Patent No. 3,740,319. Divided and this application Feb. 15, 1972, Ser. No. 226,446
Claims priority, application Japan, June 13, 1969, 44/46,166
Int. Cl. A61k 27/00; C07c 103/52; C12d 1/00
U.S. Cl. 260—112.5                                2 Claims

ABSTRACT OF THE DISCLOSURE

A process for the production of pepstatin having the following structure:

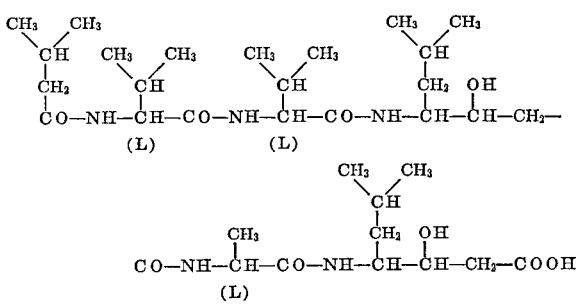

which comprises cultivating a strain of Streptomyces producing pepstatin in a nutrient medium under aerobic condition until substantial activity to inhibit pepsin is imparted to said cultured medium and recovering said pepstatin from said cultured medium.

---

This is a division, of application Ser. No. 37,165, filed May 14, 1970 now U.S. Pat. No. 3,740,319.

This invention relates to a new and useful microbial product named pepstatin inhibiting pepsin and to its production. More particularly, it relates to processes for its production by fermentation and methods of its recovery and purification. This invention embraces this antipepsin agent, its salts, and its esters in dilute solutions, as crude concentrates, as crude solids, as purified solids and in pure crystalline forms. This substance, its salts and its esters are effective in inhibiting pepsin and exhibit therapeutic and protective effect on experimental stomach ulcer of rats and mice. They have low toxicity and are useful for treatment of stomach and duodenum ulcer of human.

There is now provided, according to the present invention, an anti-pepsin compound (and its salts and esters) effective in inhibiting protease action of pepsin, said anti-pepsin compound being soluble in methanol, acetic acid, dimethylsulfoxide and pyridine, slightly soluble in ethanol, propanol, butanol, amylalcohol, substantially insoluble in ethyl acetate, butyl acetate, ethyl ether, carbon tetrachloride, hexane, petroleum ether, benzene and chloroform, melting at 228–229° C., exhibiting strong end absorption without a maximum except a low shoulder at 260–270 mu of $$E_{1\,cm.}^{1\%} = \text{about } 0.3,$$

exhibiting levorotation of $(\alpha)_D^{27} = -90°$ (C=0.288 in methanol), giving positive Rydon-Smith reaction (if it is tested on thin layer chromatogram, and sodium hydroxide solution is sprayed before spraying of the reagent), being negative in reactions of ninhydrin, Sakaguchi, naphthoresorcin, anisaldehyde-sulfuric acid reactions, exhibiting following bands in the infrared region of the spectrum when pelleted with potassium bromide: 3320, 3090, 2955, 1710, 1635, 1545, 1470, 1450, 1420, 1390, 1370, 1300, 1220, 1178, 1070, 710 cm.$^{-1}$, having the formula of $C_{34}H_{63}N_5O_9$ which is shown by the mass spectrum of the methyl ester of the diacetyl derivative and by the elemental analysis, yielding L-valine and L-alanine in ratio of 2:1 after hydrolysis, having a carboxyl group which gives methyl ester ($C_{35}H_{65}H_5O_9$, m.p. 249–251° C.) which is active in inhibition of pepsin.

There are included within the scope of the present invention pepstatin, its salts, its esters which are active in inhibiting pepsin. Pepstatin has a carboxyl group and it is easily esterified by ordinary method for conversion of carboxyl to ester such as heating in acid methanol, diazomethane reaction etc.

Figure 1:
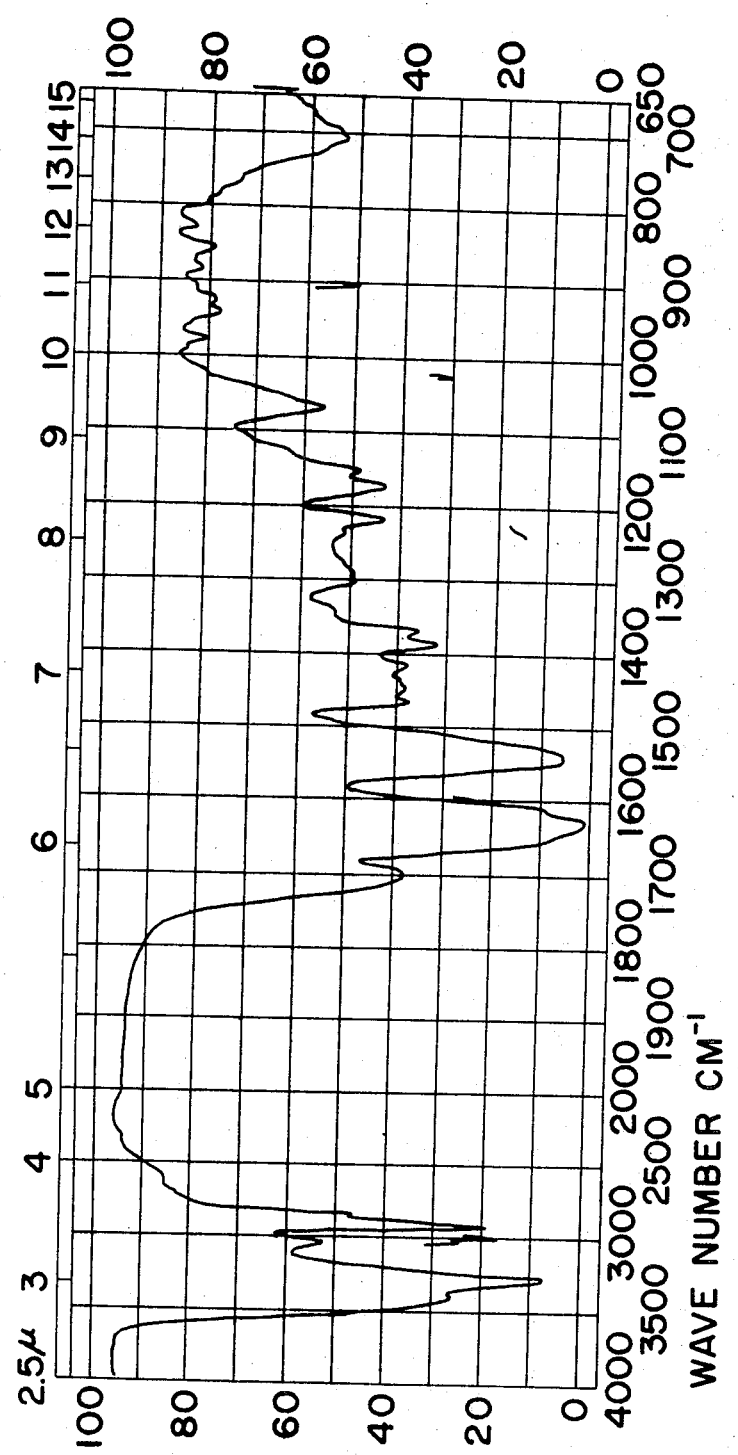
FIG. 1 is the infrared absorption spectrum of pepstatin pelleted in potassium bromide.

There is further provided, according to the present invention, the processes for production of pepstatin which comprise cultivating a strain of actinomycetes in an aqueous solution containing carbon sources and nutritional carbon sources and nitrogen sources under aerobic condition until a substantial amount of pepstatin is accumulated in said solution and extracting and isolating pepstatin therefrom. It is also provided, according to the present invention processes for preparation of the esters from pepstatin.

The systematic screening of microbial products having activity to inhibit enzymes was started by the present inventors since 1965, and aquayamycin inhibiting tyrosine β-hydroxylase, fusaric acid inhibiting dopamine β-hydroxylase and exhibiting hypotensive effect, and leupeptins inhibiting trypsin, plasmin and kallikrein have been discovered by the present inventors. The present inventors have thought that microorganisms produce proteases, esterases etc. and for the protection to their own enzymes the inhibitors would be also produced. By the continuation of this study, pepstatin was discovered in culture filtrates of several actinomycetes. Moreover, pepstatin was confirmed to show therapeutic or protective effect against stomach ulcer. It can be also emphasized that pepstatin is the first compound specifically to inhibit pepsin. Any of specific pepsin inhibitor has not been known before pepstatin. As shown in this invention, pepstatin has been already found in several species of actinomycetes and it is suggested to be distributed widely in actinomycetes. In this invention, characters of three strains from which pepstatin was isolated are described. The description in parenthesis ( ) follows the color standard shown in Color Harmony Manual of Container Corporation of America.

Characters of the strain MC144–C1:

The strain was isolated from a soil sample collected in a forest at Cux Haven in West Germany in August 1968 and numbered in the laboratory of the present inventors as No. MC144–C1. It was deposited in Kogyo Gijutsuin Hakko Kenkujyo on May 21 of 1969 and the deposit number is 312. This strain has been deposited in American Type Culture Collection and the number, ATCC 21469 was given, and therefore it is now available for scholars. Microscopically, substrate mycelia are well branched and extend aerial hyphae in slightly waving form. On aerial hyphae, open spirals, terminal spirals, terminal spirals and hooks are formed but whorls are not observed. Surface of spores is smooth.

The characters on various media are as follows:

(1) On glycerol Czapek medium (cultured at 27° C.): growth is pale yellow to pale brown, and later pale yellowish brown; aerial mycelium develops slightly and is grapish white to light gray: yellowish soluble pigment is produced after the prolonged cultivation;

(2) On Krainsky glucose asparagine agar (cultured at 270° C.): growth is pale yellow to yellow (Pastel Yellow, 1½ fb); aerial mycelium is grayish white to light gray; no soluble pigment;

(3) On calcium malate agar (cultured at 27° C.): growth is poor and colorless; aerial mycelium is thin and grayish white to light gray; no soluble pigment; no transparent zone is observed arround the growth:

(4) In peptone water containing 1.0% sodium nitrate (cultured at 27° C.): growth is very poor and colorless; no aerial mycelium; no soluble pigment; reduction of nitrate to nitrite is not clear.

(5) On potato slice (cultured at 27° C.): growth is abundant and pale yellow pale brown or reddish brown (Rust Tan, 5 le-BrickRed, 6ng); aerial mycelium is slight and white to grayish white; no soluble pigment;

(6) On starch plate (cultured at 27° C.): growth was not observed when cultured for 21 days;

(7) On peptone meat extract agar (cultured at 37° C.): growth was not observed when cultured for 21 days;

(8) On peptone meat extract agar (cultured at 27° C.): growth is colorless; no aerial mycelium; no soluble pigment;

(9) On Loeffler coagulated serum (cultured at 37° C.) and 30° C.): growth was not observed when cultured for 21 days;

(10) Stab culture in bouillon gelatin (20° C.): growth is colorless; no aerial mycelium; no soluble pigment; liquefaction of gelatin was observed on third day of the culture and proceeded, that is, liquefaction is strong;

(11) In milk medium (cultured at 37° C.): growth is colorless; no aerial mycelium, no soluble pigment; milk is coagulated and thereafter peptonized; coagulation and peptonization are strong;

(12) On tyrosine agar (cultured at 27° C.): growth is poor and colorless; no aerial mycelium; no soluble pigment; tyrosinase is negative;

(13) On cellulose (cultured at 27° C.): growth was not observed for 21 days.

Utilization of carbohydrates were tested on Pridham-Gottlieb medium (cultured at 27° C.) and the result was as follows: glycerol, mannose and sucrose are utilized, yielding abundant growth; arabinose, xylose, rhamnose, fructose, inosirol, sorbitol, maltose, lactose, raffinose, dulcitol, salicin and inulin are not utilized; dextrin and starch are slightly utilized; mannitol and galactose give very slight growth and seem to be not utilized. The characters of the strain MC155–C1 described above can be summarized as follows: it belongs to streptomyces, forming spirals but not whorls, yielding spores of smooth surface, yielding abundant growth on potato slice but not so abundant on other media; when cultured as 37° C., the growth is poor; it has strong proteolytic activity; the growth is pale yellow, yellow or pale brown on various media; aerial mycelium is then and grayish white, or light gray on various media; it belongs to nonchromogenic type; the reddish brown growth on potato slice is characteristic. If these properties are compared with those of known species, then there are resemblances between this strain and *Actinomyces longisporus-flavus* Krasinikov described in International Journal of Systematic Bacteriology 18, 342, 1968 and Vol. 2, 237 page of the book "The Actinomycetes" written by S. A. Waksman. The differences and resemblances are as follows:

|  | The strain MC144–C1 | A. longisporus-flavus |
|---|---|---|
| Whorl | None | None. |
| Spiral | Formed | Formed. |
| Surface of spores | Smooth | Smooth. |
| Aerial mycelium | Thin, grayish white to light gray. | Poor or none *— abundant, whitish yellow to brownish yellow.** |
| Growth | Pale yellow, yellow, pale brown. | Yellow. |
| Tyrosinase | None | None. |
| Proteolytic action | Strong | Medium in strength. |
| Hydrolysis of starch | Questionable | Weak. |
| Utilization of carbon: |  |  |
| Sucrose | Utilized | Not utilized. |
| Rhamnose | Not utilized | Utilized. |
| Arabinose | do | Do. |
| Xylose | do | Do. |
| Fractose | do | Do. |

\* Description in Int. J. Systematic Bacteriology, 18, 342, 1968
\*\* Description in the Actinomycetes by S. A. Waksman, Vol. 2, 237 p.

As above described, the strain MC144–C1 is different from *A. longisporus-flavus* in the utilization of carbohydrates and in the character of aerial mycelium. The color of the growth of the strain MC144–C1 on potato slice is characteristic and this train was assigned to a new species designated *Streptomyces testaceus*.

Characters of the strain MC221–C2:

A strain isolated from a soil collected in Kamakura, October 1968 was numbered MC221–C2. Microscopically, substrate mycelium is well branched, extending aerial hyphae forming terminal spirals and hooks. Whorl is not formed. The aerial mycelium is more curved than those of the strain MC144–C1. It utilizes galactose slightly and the liquefaction of gelatin is weak. Except these points of sugar utilization and liquefaction of gelatin, this strain resembles the strain MC144–C1 as described above. Therefore, this strain can be assigned to the same species as MC144–C1.

Characters of MC210–A1:

This strain was isolated from a soil sample collected at Toyonaka, Osaka, in October, 1968 and numbered as MC210–A1 in the inventor's laboratory. This strain was deposited in Kogyo Gijutsuin Hakko Kenkyujyo on May 21, 1969 and the deposit number 313 was given. This strain has been deposited in American Type Culture Collection and the number 21468 was given, and therefore it is now available for scholars. Microscopically, substrate mycelia are well branched extending a typical aerial mycelium in coil form and spirals are formed. Whorl is not observed. The surface of the spores is smooth.

Characters on various media are as follows:

(1) On glycerol Czapek agar (cultured at 27° C.): growth is colorless; aerial mycelium is thin and white, light gray, or gray; no soluble pigment;

(2) On Krainsky glucose asparagine agar (cultured at 27° C.): growth is colorless to pale yellow; areial mycelium is grayish white to light gray; a slightly yellow-colored soluble pigment is formed;

(3) On calcium malate agar (cultured at 270 C.): growth is colorless; aerial mycelium is white, light brownish gray to gray; no soluble pigment; no transparent zone is observed around the growth;

(4) In peptone water containing 1.0% sodium nitrate (cultured at 27° C.): growth is colorless; aerial mycelium is white; no soluble pigment; slightly nitrate is formed;

(5) On potato slice (cultured at 27° C.): growth is pale yellowish brown to dark yellow [Mustard, 21e]; aerial mycelium is abundant and white, grayish white to light gray; pale yellowish brown soluble pigment is formed;

(6) On starch plate (cultured at 27° C.): growth is pale yellow to yellow; aerial mycelium is white to brownish gray; pale yellow to yellow soluble pigment is formed; hydrolysis of starch is weak;

(7) On peptone meat extract agar (cultured at 37° C.): growth is colorless; aerial mycelium is white; no soluble pigment;

(8) On peptone meat extract agar (cultured at 27° C.): growth is colorless, aerial mycelium is abundant and white; no soluble pigment;

(9) On Loeffler coagulated serum (cultured at 37° C): growth is colorless to pale yellow; aerial mycelium is yellowish white; no soluble pigment; no liquefaction;

(10) Stab culture in gelatin (cultured at 20° C.): growth is colorless, pale yellow to pale yellowish brown; aerial mycelium is white; brownish soluble pigment is formed; liquefaction is observed after about 20 days culture and very weak;

(11) In milk (cultured at 37° C.): growth is colorless; no aerial mycelium; no soluble pigment; milk is coagulated and peptonized though coagulation and peptonization are relatively weak;

(12) On tyrosine agar (cultured at 270 C.): growth is colorless; aerial mycelium is white, grayish white to light gray; no soluble pigment; tyrosinase is negative;

(13) On cellulose (cultured at 27° C.): growth is slight and decomposition is not observed;

The utilization of carbohydrates were tested on Pridham-Gottlieb medium and the following results were obtained: glycerol, xylose, glucose, fructose, mannose, galactose, inositol, mannitol, sorbitol, maltose, sucrose, raffinose, dextrin and starch are utilized, yielding good growth; lactose and salicin are not utilized, because growth is very slight; rhamnose, arabinose, dulcitol and inulin are not utilized. The characters of the strain MC210–A1 described above can be summarized as follows: it belongs to nonchromogenic type of streptomyces; spirals are formed but not whorls; surface of spores is smooth, growth is colorless, pale yellow or yellow on various media; aerial mycelium is white to light gray on various media; soluble pigment is generally none except yellowish to brownish pigment slightly; it has weak proteolytic activity and hydrolytic activity of starch. Among known species of actinomycetes, *Streptomyces argenteolus* described by Fried, Perman, Langlykke and Titus in International Journal of Systematic Bacteriology 18, 295, 1968 and in the book "Actinomycetes" written by S. A. Waksman vol. 2, page 175 is most resembling to this strain. The strain MC210–A1 resembles *S. argenteolus* except utilization of carbohydrates and liquefaction of gelatin. Therefore, the strain MC210–A1 was designated a variant of this species, that is *Streptomyces argenteolus* var. *toyonakensis*.

*Streptomyces testaceous* and *Streptomyces argenteolus* var. *toyonakensis* described in this invention includes all mutants and variants thereof, that is, those which produce pepstatin and can not be differentiated from these species including mutants and variants are included in the definition of *Streptomyces testaceus* and *S. argenteolus* var. *toyonakensis* in this invention. Moreover, pepstatin is an inhibitor of a protease and may behave to control the activity of the protease in actinomycetes, therefore, it is thought to be produced widely by actinomycetes. Really, the present inventors have isolated pepstatin also from other strains to belong to other species. For example, another strain MC284–C1 isolated from a soil sample collected at Shinhoriuchi, Saitama Prefecture was also confirmed to produce pepstatin. This strain produces also mitomycins and tentatively classified as *Streptomyces caespitosus*.

In this invention therefore, instead of the names of the above species, pepstatin-producing streptomyces is used for description.

Method of testing the activity of pepstatin inhibiting pepsin:

The method described by Kunitzis in J. General Physiology, 30, 291, 1947 was modified and pepsin which was marketed by Sigma Chemical Co., St. Louis, Missouri, U.S.A. and casein which was marketed by Wako Junyaku, Osaka, Japan, were employed. Casein is dissolved in 0.08M lactic acid buffer (pH 2.2) at 0.6% and to one ml. of this casein solution 0.7 ml. of 0.02N HCl–0.02M KCl buffer (pH 2.0) and 0.2 ml. of this buffer solution with or without a test sample are added and incubated at 37° C. for 3 minutes. Thereafter, 0.1 ml. containing 4 $\mu$g. of pepsin in 0.02N HCl–0.02 M KCl fuffer (pH 2.0) is added, mixed and incubated at 37° C. for 30 minutes. Then, 2.0 ml. of perchloric acid (1.7M) is added to stop the reaction. After 1 hour, it was centrifuged and the supernatant is subjected to the determination of the optical density (a) at 280 m$\mu$. The reaction mixture without pepstatin was treated similarly and from this optical density the percent inhibition $(b-a)/b \times 100$ was calculated. The amount of pepstatin in a test material is obtained from its percent inhibition and a standard curve for the concentration of pepstatin and the percent inhibition. Pepstatin showed 50% inhibition when its 0.02 $\mu$g. was added to the reaction mixture.

Pepstatin-producing streptomyces when grown under suitable conditions produces pepstatin is prepared by inoculating spores or mycelia of a pepstatin-producing organism into a suitable medium and then cultivated under aerobic condition. For the production of pepstatin cultivation on a solid sodium is possible, but for production of large quantities cultivation in a liquid medium is preferred. Any fermentation temperature can be employed within the range in which pepstatin-producing organisms can grow and produce pepstatin, although 25–35° C. is preferred. Media consisting of known nutritional sources for actinomycetes are useful for the production of pepstatin. For example, commercial products such as peptone, meat extract, yeast extract, corn steep liquor, cotton seed flour, soybean flour, yeast extract, N–Z amine, casein, sodium nitrate, ammonium nitrate, ammonium sulfate and other nitrogenous materials such as wheat bran, rice bran etc. are useful as the nitrogen source. The commercially available products such as lactose, glycerol, sucrose, starch, glucose, maltose, molasses and other carbohydrates or fats in pure or crude state are useful as the carbon source. Among these glycerol, glucose, maltose, dextrin and starch are examples of cheap and suitable carbon sources for production of pepstatin. Sodium chloride, sodium or potassium phosphate, calcium carbonate or magnesium ion can be also added. Traces of metal salts can be added, if necessary. Any kinds of constituents which can be utilized by pepstatin-producing organisms for production of pepstatin is useful. Any material which have been known for cultivation of actinomycetes are useful.

The fermentation is continued until pepstatin is substantially accumulated. For example, the strain MC144–Cl was inoculated to various media containing various carbon sources, various nitrogen sources, NaCl 0.3%, MgSO$_4$·7H$_2$O 0.1%, K$_2$HPO$_4$ 0.1%, metal solution 0.1 ml./100 ml., and shake-cultured at 27–29° C. on a reciprocating shaking machine (amplitude 8 cm., 200 strokes/minute). The metal solution consisted of CuSO$_4$·5H$_2$O 700 mg., FeSO$_4$·7H$_2$O 100 mg.,

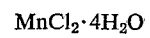

MnCl$_2$·4H$_2$O 800 mg., ZnSO$_4$·7H$_2$O 200 mg. in 100 ml. of distilled water. Shake flasks of 500 ml. volume were used and 100 ml. of each medium was placed. On each day of the shaking culture, 0.05 ml. of 100 times diluted broth filtrate was tested for the anti-pepsin activity and the results shown in Table 1 was observed. Pepstatin production was recognized already after two days of the shaking culture and the maximum yield was found on 4-7 day of the culture. pH at the maximum production was often about 9.0. Even pH 9.0 was maintained during the shaking culture for 10 days, no decrease of pepstatin was observed suggesting its stable property. As shown in Table 1, various carbon sources and nitrogenous materials can be used for production of pepstatin.

cium chloride, therefore, it is a suitable method to extract pepstatin in mycelium mass with acidic methanol containing CaCl. Pepstatin in the liquid part is extracted with water-immiscible solvents in which pepstatin is more soluble than in water, for instance with butanol. Evaporation of pepstatin solution gives crude powder containing pepstatin, or crystals of pepstatin. If the fermentation yield is

TABLE 1.—PRODUCTION OF PEPSTATIN IN VARIOUS MEDIA

| | Day of culture and inhibition percent of pepsin by 0.05 ml. of 100 times diluted culture filtrate | | | | | | | | | |
|---|---|---|---|---|---|---|---|---|---|---|
| | 3 | | 4 | | 5 | | 6 | | 7 | |
| | pH | Percent | pH | Percent | pH | Percent | pH | Percent | pH | Percent |
| Medium number: | | | | | | | | | | |
| 1 | 7.4 | 9.9 | 6.8 | 24.1 | 7.8 | | 8.5 | 14.0 | 8.8 | |
| 2 | 6.9 | 50 | 7.9 | 84 | 8.1 | 86 | 8.4 | 88 | 8.7 | 85 |
| 3 | 6.2 | 56 | 8.0 | 71 | 8.4 | 70 | 8.5 | 75 | 8.7 | 67 |
| 4 | 5.3 | 47 | 5.3 | 64 | 5.4 | 62 | 5.4 | 55 | 7.2 | 72 |
| 5 | 7.8 | 36 | 8.5 | 39 | 8.8 | | 8.9 | 48 | 9.0 | |
| 6 | 7.9 | 37 | 8.0 | 32 | 8.6 | | 8.7 | 37 | 8.8 | |
| 7 | 7.6 | 18 | 7.7 | 29 | 7.9 | | 8.2 | 22 | 8.6 | |
| 8 | 7.3 | 8.2 | 8.2 | 9.4 | 8.5 | | 8.3 | 13 | 7.6 | |
| 9 | 5.7 | 82 | 7.7 | 92 | 8.3 | 85 | 8.2 | 87 | 8.7 | 88 |
| 10 | 7.2 | 84 | 8.4 | 81 | 8.7 | 83 | 8.4 | 87 | 8.3 | 82 |
| 11 | 6.3 | 40 | 6.3 | 69 | 6.5 | 80 | 7.0 | 83 | 8.3 | 82 |
| 12 | 5.3 | 35 | 5.4 | 43 | 5.4 | | 5.4 | 42 | 5.9 | |
| 13 | 6.7 | 81 | 8.0 | 83 | 8.5 | 83 | 8.4 | 86 | 8.8 | 85 |
| 14 | 7.6 | 83 | 8.2 | 84 | 8.4 | 85 | 8.2 | 88 | 8.3 | 88 |
| 15 | 6.3 | 52 | 5.5 | 76 | 6.4 | 77 | 7.8 | 82 | 8.3 | 81 |
| 16 | 5.3 | 31 | 5.4 | 31 | 5.8 | | 6.3 | 48 | 7.1 | | carbon and nitrogen sources of media: No. 1, 2% glycerol, 0.75% meat extract, 0.75% peptone; No. 2, 2% glycerol, 1.0% N-Z amine, 0.2% yeast extract; No. 3, 2.0% glycerol, 1.5% soybean meal; No. 4, 2% glycerol, 1.5% corn steep liquor; No. 5, 2% lactose, 0.75% meat extract, 0.75% peptone; No. 6, 2% lactose, 1.0% N-Z amine, 0.2% yeast extract; No. 7, 2% lactose, 1.5% soybean meal; No. 8, 2% lactose, 1.5% corn steep liquor; No. 9, 1% glucose, 1% lactose, 0.75% meat extract, 0.75% peptone; No. 10, 1% glucose, 1% lactose, 1% N-Z amine, 0.2% yeast extract; No. 11, 1% glucose, 1% lactose, 1.5% soybean meal; No. 12, 1% glucose, 1% lactose, 1.5% corn steep liquor; No. 13, 2% glucose, 1.0% N-Z amine, 0.2% yeast extract; No. 14, 2% glucose, 1.0% N-Z amine, 0.2% yeast extract; No. 15, 2% glucose, 1.5% soybean meal; No. 16, 2% glucose, 1.5% corn steep liquor.

For production of pepstatin by fermentation, the ordinary methods used for antibiotics can be employed. For instance, 100 liters of a medium was placed in a stainless fermenter of 200 liters volume, and sterilized, pepstatin-producing organism was inoculated, and fermentation was performed under aeration of 100 liters of sterile air/minute, then after 45-60 hours production of pepstatin reached the maximum.

There is provided according to the present invention, processes for isolation, purification of pepstatin, its salts and pepstatin esters.

Pepstatin is stable at pH 2.0-9.0, when the solutions at these various pH are heated at 60° C. for 30 minutes, and pepstatin remains without any decrease of the activity.

Pepstatin which is only slightly soluble in water exists not only in cultured liquid but also it is included in the mycelium mass. When the fermentation yield is not large, mostly pepstatin exists in the liquid part, but when it is high, a large amount is included in the mycelium mass. Pepstatin in mycelium mass is extracted with solvents in which pepstatin is soluble, for instance with methanol. Pepstatin has carboxyl groups and forms salts such as $Na^+$, $Ka^+$, $NH^+$, $Li^+$, $Ca^{++}$, $Mg^{++}$, $Cu^{++}$, $Ba^{++}$, $Fe^{++}$, $Mn^{++}$, etc. Sodium or potassium salts of pepstatin have similar solubilities as pepstatin, but salts of calcium, magnesium and heavy metals are less soluble in water and methanol. Therefore it is desirable to extract pepstatin from mycelium mass to the solvents in the acid condition. Pepstatin is more soluble in methanol containing calhigh, evaporation of butanol extract from the cultured broth gives crystals of pepstatin.

Pepstatin is a stable compound therefore, culture filtrate itself can be concentrated by distillation, preferably under reduced pressure, and from the concentrated solution or the dried residue it is extracted with organic solvents such as methanol, butanol etc. in which pepstatin is enough soluble. The cultured beer containing mycelium can be subjected to extraction with a water-immiscible solvent such as propanol, butanol, or amylalcohol to extract pepstatin in the liquid part and in the mycelium part at one time.

For extraction of pepstatin into the solvents, ordinary methods using multistage extracter, for instance, Podobealniak centrifuge, can be employed.

Adsorption method is also useful for extraction and purification of pepstatin. For this purpose, active carbon, ion exchange resins, alumina, silica gel etc. are useful. For instance, pepstatin in culture filtrates can be adsorbed by active carbon and after washed with water, pepstatin on carbon is eluted with methanol or aqueous methanol. For elution the raise of the temperature increases the elution yield. For instance, active carbon was added to culture filtrate at 2.0%, and the carbon was treated twice with 20 times volume of methanol at 40° C. under stirring, then, pepstatin was eluted and the yield from the culture filtrate was about 80%. Carbon chromatography is useful for purification of pepstatin. For instance, after pepstatin adsorbed on carbon and the carbon was washed with 40% aqueous methanol (methanol 40:$H_2O$ 60), pepstatin chromatography was performed with 80% aqueous methanol (methanol 80:$H_2O$ 20). The use of carbon was also helpful to remove colored impurities. Silica gel chromatography is also useful for purification of pepstatin. For instance, n-butanol-acetic acid-water-butyl acetate (4:1:1:4 in volume) or ethyl acetate-methanol (3:1 in volume) was useful solvent system for purification of pepstatin by a silica gel chromatography. Alumina chromatography is also useful for purification. For instance, it is performed, using methanol, ethanol, butanol or the mixture of these alcohols with esters.

Pepstatin has carboxyl group. Depending on this acid property, strong or weak basic ion exchange resins are used for extraction and purification of pepstatin.

Pepstatin itself is easily crystallized. A solvent in which pepstatin is soluble is useful for crystallization, for instance, methanol is an example used for crystallization.

Carboxyl group of pepstatin is easily converted to its ester by ordinary methods of preparation of esters, for instance, by heating with the corresponding alcohol at acid or diazomethane method. Esters are also active in inhibition or pepsin. Methyl ester is more active than pepstatin.

If the yield of pepstatin in the fermentation beer is high, crystals of pepstatin are obtained by simple processes. For instance, extraction of pepstatin with butanol and concentration of butanol extract under vacuum give crystalline pepstatin which is recrystallized from methanol, yielding white needle crystals of pepstatin.

Properties of pepstatin are here described. Pepstatin crystallizes as white needle crystals and the most purified pepstatin melts at 228–229° C. It is optically active, and —90° C. was obtained for $[\alpha]_D^{27}$ in 0.288% methanol solution. The elemental analysis gave the following results: calcd. for $C_{34}H_{63}N_5O_9$: C, 59.53, H, 9.25, N, 10.21, O, 20.99; found: C, 59.02, 60.27, H, 9.27, 9.37, N, 10.11, 9.90, O, 21.41, 21.15. On the basis of the analytical results, the formula of $C_{35}H_{65}N_5O_{10}$ (the values calculated are C, 58.72, H, 9.15; N, 9.78, O, 22.35) and $C_{35}H_{65}N_5O_9$ (the values calculated are C, 60.06, H, 9.36, N, 10.01, O, 20.57) can not be excluded, however, the formula of $C_{34}H_{63}N_5O_9$ was supported by the mass spectrum. The parent peak for methyl ester of diacetyl pepstatin was 783 and that for methyl ester of pepstatin 699. The molecular weight determination by Akiya-Berger method using a pyridin solution of pepstatin indicated the molecular weight of 600–730.

Figure 2:
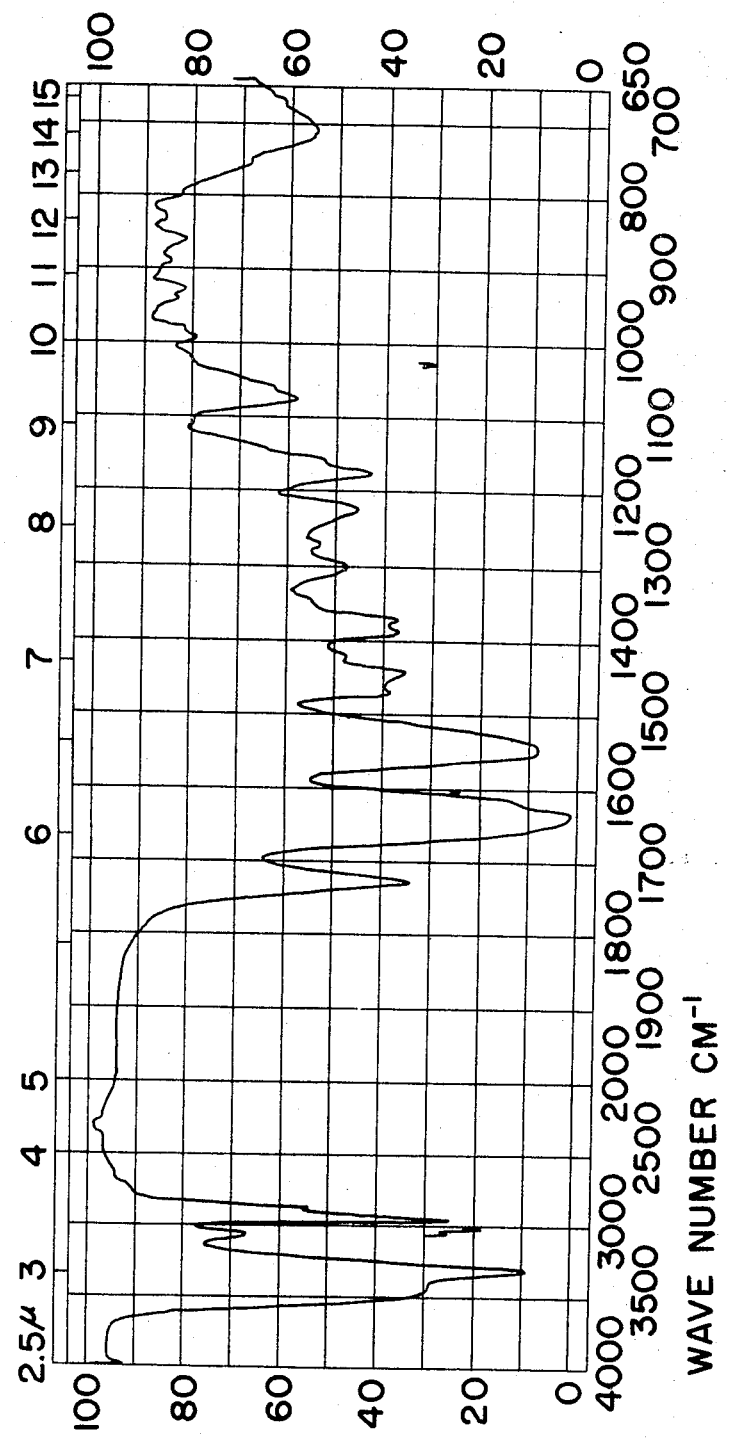
FIG. 2 is the infrared absorption spectrum of methyl ester of pepstatin pelleted in potassium bromide.
Figure 3:
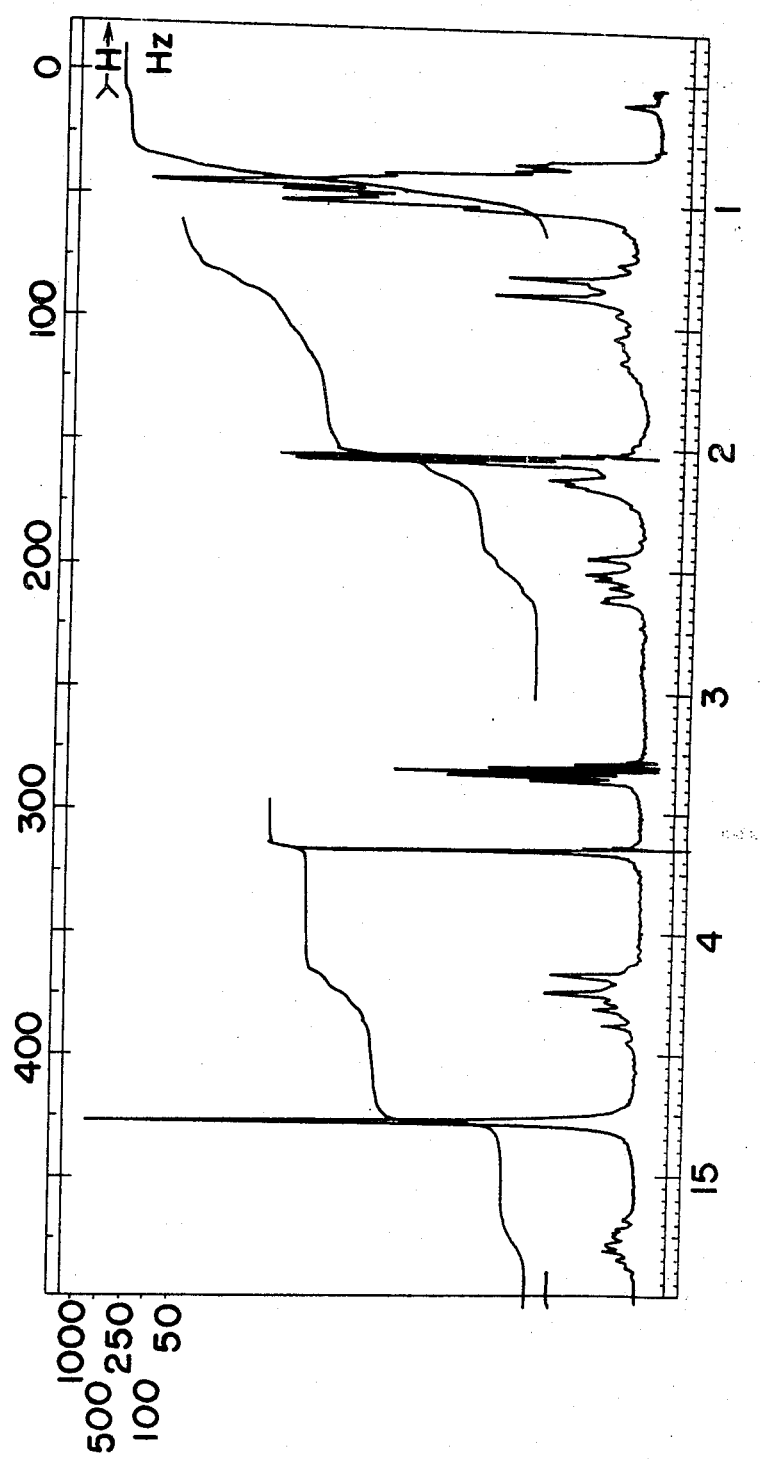
FIG. 3 is the nuclear magnetic resonance of methyl ester of diacetylpepstatin taken in tetradeuteromethanol.

The infrared spectrum is shown in FIG. 1, in which the following bands are observed: 3320, 3090, 2955, 1710, 1635, 1545, 1470, 1450, 1420, 1390, 1370, 1300, 1220, 1178, 1070, 810 cm.$^{-1}$. The infrared spectrum of methyl ester of pepstatin is shown in FIG. 2. The nuclear magnetic resonance spectrum of methyl ester of diacetyl pepstatin was taken by Varian HA-100 equipment in tetradeuteromethanol using trimethylsilane as the internal standard and shown in FIG. 3.

The hydrolysis of pepstatin in 6N HCl at 100° C. for 18 hours yields L-alanine and L-valine which are shown by amino acid analysis in the ratio of 1:2. Pepstatin gives positive Rydon-Smith reaction and these results and the bands in the infrared spectrum at 1635 and 1545 cm.$^{-1}$ indicate peptide bonds in pepstatin.

The band in the infrared spectrum at 1710 cm.$^{-1}$ indicates the presence of carboxyl group in pepstatin. It is also shown by the adsorption on an anion exchange resin. The treatment of pepstatin with deazomethane or heating with sulfuric acid and an alcohol gives the corresponding ester. Methyl ester of pepstatin prepared shows an ester band at 1730 cm.$^{-1}$ instead of the band at 1710 cm.$^{-1}$. A result of elemental analysis of the methyl ester was as follows: calcd. for $C_{35}H_{65}N_5O_9$: C, 60.05, H, 9.36, N, 10.00, O, 20.57; found: 59.88, H, 9.35, N, 9.74, O, 20.69.

Pepstatin which has a carboxyl group forms salts, and the salts are easily prepared by neutralizing or adding calculated amount of a base to the methanol solution of pepstatin. For instance, sodium pepstatin (m.p. 250–252° C., dec.; calcd. for $C_{34}H_{62}N_5O_9Na$: C, 57.68, H, 8.82, N, 9.89, O, 20.34, Na, 3.24; found: C, 57.97, H, 8.92, N, 9.96, O, 20.26, Na, 2.98), magnesium pepstatin (m.p. 257–258° C., dec.; calcd. for $C_{34}H_{62}N_5O_9$ ½ Mg: C, 58.58, H, 8.96, N, 10.04, O, 20.65, Mg, 1.74; found: C, 58.30, H, 9.05, N, 9.94, O, 20.84, Mg, 1.49), and calcium pepstatin (m.p. 262–263° C., dec.; calcd. for $C_{34}H_{62}N_5O_9$ ½ Ca. C, 57.93, H, 8.86, N, 9.93, O, 20.42, Ca, 2.84; found: C, 57.92, H, 8.98, N, 9.62, O, 20.07, Ca, 2.62) were prepared. Calcium pepstatin is less soluble in water and methanol than pepstatin, however pepstatin is more soluble in methanol with $CaCl_2$ than in that without $CaCl_2$. Pepstatin which has carboxyl group gives amide. For instance, treatment of methyl ester of pepstatin in methanol yielded pepstatin amide.

A treatment of pepstatin with acetic anhydride in pyridine gives diacetyl and monoacetyl pepstatins which are separated by a column chromatography using silica gel and methanol-acetone-chloroform (5:25:70 in volume).

In thin layer chromatographies using silica gel G the following Rf values are observed for pepstatin in the following solvents: 0.78, butyl acetate-butanol-acetic acid-water (6:6:1:1 in volume), 0.73 butyl acetate-butanol-acetic acid-water (6:4:1:1), 0.76 butyl acetate-butanol-acetic acid-water (4:4:1:1 in volume).

In high voltage electrophoresis using acidic solvent such as formic acid-acetic acid-water (25:75:900 in volume) under 3500 v. for 15 minutes pepstatin does not move, suggesting no basic group in pepstatin.

The following structure was proposed for pepstatin by degradation studies, N.M.R. spectrum of mass spectrometry of pepstatin and its derivatives:

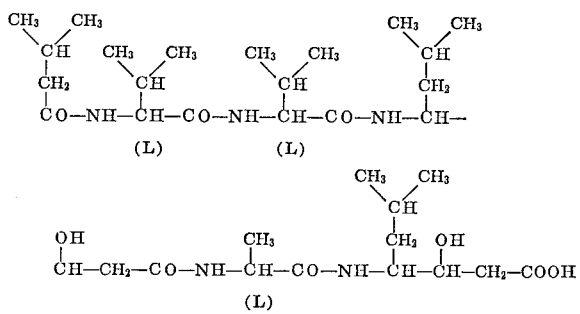

Pepstatin has low toxicity. Mice, dogs, rats and rabbits tolerated oral administration of 2,000 mg./kg. of pepstatin without any toxic sign. $LD_{50}$ to animal by the intraperitoneal injections are approximately as follows: mice 1,000 mg./kg.; rate 880 mg./kg.; rabbits 820 mg./kg.; dogs 450 mg./kg. Daily 250 mg./kg. of oral administration to rats for 90 days caused no toxicity and rats grew with the normal growth rate.

Pepstatin given orally is not absorbed. For instance, when orally 50 mg./kg. was given, none of pepstatin was found in blood and urine during 24 hours after the administration, and about 90% was proved in feces excreted during 72 hours after the administration.

The esters, the amide and the acetyl derivatives of pepstatin showed 50% inhibition of pepsin in the method described above at the following concentrations: pepstatin 0.01 μg./ml; the methyl ester 0.008 μg./ml; ethyl ester 0.01 μg./ml; the p-bromophenacyl ester 0.01μg./ml; the amide 0.027 μg./ml; the monoacetyl derivatives 1.1 μg./ml; the diacetyl derivative 4.2 μg./ml; methyl ester of the diacetyl derivative 2.26 μg./ml. However, pepstatin shows no inhibition against thrombokinase, plasmin, trypsin, kallikrein, α-chymotrypsin and papain even at 250 μg./ml. Thus, pepstatin is a strong specific pepsin inhibitor. Proctase is a kind of pepsin obtained from Aspergillus niger as reported in Agricultural Biological Chemistry (Japan), Vol. 28, pages 216–223, 1964. In the reaction mixture as above described except containing the same amount of proctase instead of pepsin, concentrations for 50% inhibition were as follows: 0.02 μg./ml. against casein hydrolysis.

A strong pepsin inhibitor has never been known before the present discovery of pepstatin. Though sulfuric esters of polysaccharide have been known to inhibit pepsin, its effect is very weak and it also inhibits blood coagulation. Pepstatin is a strong inhibitor of pepsin as shown by 50% inhibition concentration described above and it has no effect on blood coagulation. The strong effect inhibiting pepsin indicates that pepstatin is effective on stomach ulcer. Really it has been confirmed by the clinical studies.

Stomach ulcer of rats made by the method described by Takagi et al. in the Japanese Journal of Pharmacology, 18, pages 9–18, 1968, that is, placing male rats in a cage at 23° C. for 22 hours, are protected or therapeutically treated for pepstatin. When 50 mg./kg. of pepstatin was orally given 30 minutes before the stress, the rats were sacrificed 48 hours after the stress. The curative ratio of the ulcer was 76.3%. When the dose was 10 mg./kg., the inhibition percent of the ulcer was 65.6%. When 50 mg./kg. of pepstatin was given immediately after the stress and once daily for 4 days, the rats were sacrificed. The rapid cure of ulcers were proved in rats treated with pepstatin.

The effect against stomach ulcers of rats caused by pylorus ligation (shay rats) is also shown. The method described by Watanabe and Kasuya in Chemical Pharmaceutical Bulletin, 11, 1282, 1963 was employed. In rats administered with 2 mg./kg. or the larger dose 30 minutes and 14 hours after pylorus ligation no ulcer was found. Fifty percent inhibition dose was 0.5 mg./kg. Pepsin activity in gastric juice was none or less than 10% of that of the control. Thus, pepstatin showed strong protective and curative effect against Shay rats ulcer. Oral administration of pepstatin or its esters to stomach and duodenum ulcer patients, 1-4 tablets containing 25-100 mg. of pepstatin between meals, that is, three to four times a day showed curative effect, and showed no toxic sign. After administration, pain rapidly disappeared.

Pepstatin does not inhibit papain which has a sulfhydryl group as the active site, however, pepstatin shows inhibition of Carrageenin-induced edema. (C.A. Winter, E.A. Risley and G.W. Nuss: Proc. Soc. Exp. Biol. & Med., III, 544, 1962) Pepstatin was injected intraperitoneally and Carrageenin (0.1 ml. of 1% solution) was injected to rat hind paw and 1, 3, 5, and 24 hours thereafter edema was measured. Then, more than 30% inhibition was shown by not less than 1.25 mg./kg. of pepstatin.

The following examples are intended to illustrate this invention; however, our invention should not be limited to the examples. Since the characteristics of pepstatin and the activities of pepstatin, its salts and its esters are now clear and pepstatin which inhibits hydrolysis of acid protease must be widely distributed among actinomycetes, it is easily possible to make various modifications of this invention. In the light of the foregoing disclosure, this invention covers the production of pepstatin, its concentration, its extraction, its purification and preparation of its active esters.

Example 1

A hundred ml. of a medium containing glucose 1.0%, starch 1.0%, peptone 0.75%, meat extract 0.75%, NaCl 0.3%, $MgSO_4 \cdot 7H_2O$ 0.1%, $K_2HPO_4$ 0.1%, and metal ion solution ($CuSO_4 \cdot 5H_2O$ 700 mg., $FeSO_4 \cdot 7H_2O$ 100 mg., $MnCl_2 \cdot 4H_2O$ 800 mg., $ZnSO_4 \cdot 7H_2O$ 200 mg. are dissolved in 100 ml. of distilled water) 0.1 ml. was placed in a shaking flask of 500 ml. volume and sterilized at 120° C. for 20 minutes. pH was adjusted to become 7.0 after the sterilization. One loopful amount of spores and mycelium of the strain MC144-Cl on an agar medium was inoculated and shake-cultured at 27° C. on a shaking machine (130 strokes/minute and 8 cm. amplitude). pH was 5.7 on the third day of the shaking culture and 6.3 on the fourth day. The determination of reducing sugar by anthrone method indicated the optical density of 0.9/0.005 ml. on the first day, 0.3/0.005 ml. on the fourth day and almost none on the fifth day. The cultured broth on the fifth day was filtered and 0.05 ml. of 100 times diluted filtrate showed 64% inhibition of pepsin. The cultured broth on the fifth day of 29 shaking flasks were combined and filtered and pepstatin in the filtrate was extracted with 2400 ml. and 2000 ml. of n-butanol successively. The butanol extracts were combined and evaporated under reduced pressure, yielding brown crude powder of 4 g. The fifty percent inhibition of pepsin was shown by adding 0.13 µg. of this powder to the test solution.

Example 2

Pepstatin was further purified from a crude powder which was obtained by the similar procedure as shown in Example 1. This crude powder showed 50% inhibition of pepsin by adding 0.16 µg. to the test solution. The powder of 2.1 g. was dissolved in 30 ml. of distilled water and this solution was passed through a column (72 cm. in length) of active carbon (18 g.) at the rate of 2 ml./minute. Four hundred ml. of distilled water and 300 ml. of 40% aqueous methanol were passed to wash the column and pepstatin on the column was eluted with 80% aqueous methanol (methanol 80:water 20).

The eluate was collected in fractions, each weighing 5 g., and fractions containing pepstatin were combined and evaporated under vacuum to yield 0.7 g. of a white powder. This powder showed 50% inhibition of pepsin by adding 0.054 µg. to the test solution.

Example 3

Four thousand ml. of the cultured filtrate was prepared by the same method as described in Example 1. It showed 58% inhibition of pepsin when 0.05 ml. of the 100 times diluted solution was subjected to the test of inhibition of pepsin. Eighty g. of active carbon was added and stirred for 20 minutes. Then, all pepstatin in the culture filtrate was adsorbed. The carbon which was separated by the filtration was washed with 2,000 ml. of water and pepstatin on the carbon was eluted with 2,000 ml. and 1,500 ml. of methanol successively at 40° C. The methanol eluates were combined and evaporated under vacuum to yield 15 g. of a brown crude powder. The 50% inhibition of pepsin was observed by addition of 0.6 µg. of this powder to the test solution. This powder was dissolved in 1,000 ml. of water and passed through a column containing 100 g. of active carbon (3 cm. in diameter) and chromatography was carried out by the similar procedures shown in Example 2 yielding 1.5 g. of the white powder. The fifty percent inhibition of pepsin was shown by adding 0.06 µg. of this powder to the test solution.

Example 4

The complete purification was started from 0.38 g. of a powder which was obtained by the similar procedure as shown in Example 3 and showed 50% inhibition by adding 0.06 µg. to the test solution. It was dissolved in 5.0 ml. of solvent mixture consisting of butanol, acetic acid, water and butyl acetate in 4:1:1:4 in the volume ratio and passed through a silica gel column (90 g. of the silica gel and 2.2 cm. in diameter) which had been washed with the same solvent mixture. The same solvent mixture was further passed and the eluate was collected into fractions of each 5 g. Then, pepstatin appeared in from 9 to 15 fractions and the evaporation of these fractions combined yielded 0.27 g. of a white powder and 0.04 µg. showed 50% inhibition. The crystallization of this powder from methanol yielded 0.13 g. of needle crystals of pepstatin. The addition of 0.02 µg of the crystals to the test solution showed 50% inhibition of pepsin.

Example 5

A white powder prepared by the procedure described in Example 2 showed 50% inhibition of pepsin by adding of its 0.06 µg. to the test solution. The powder of 0.4 g. was dissolved in 5.0 ml. of a solvent mixture (ethyl acetate-methanol in 3:1). The silica gel chromatography described in Example 4 but using the solvent mixture of ethyl acetate-methanol in 3:1 was carried out and the eluate was collected in each fraction weighing 5 g. Then, pepstatin appeared in 10-20 fractions. The evaporation of the combined fractions yielded 0.29 g. of white powder which showed 50% inhibition by adding its 0.03 µg. to the test solution. Crystallization from methanol yielded 0.14 g. of needle crystals of pepstatin, m.p. 224-226° C.

Example 6

One hundred fifty liters of the medium which was same as that described in Example 1 was placed in a stainless steel fermenter of 200 liters volume and sterilized at 115° C. for 30 minutes and 1 liter of the shake-cultured broth of the strain MC144–C1 was inoculated. The shaking culture was made by the same procedure as in Example 1 for 72 hours. The fermentation in the fermenter was made under stirring at 200 r.p.m. and 200 liters of sterilized air/minute at 24° C. and continued for 72 hours. Then, pH was 7.42 and 0.05 ml. of 250 times diluted culture filtrate showed 51.5% inhibition of pepsin. Diatomaceous earth of 4.5 kg. was added, filtered and the cake was washed with 12 liters of distilled water. The washed filtrate was added to the culture filtrate and the total volume was 133 liters. This filtrate was made pH 8.2 with 3N NaOH and extracted with 60 liters and 30 liters of n-butanol successively. The butanol extracts were combined and washed with 11 liters and 9 liters of water successively and concentrated by distillation under reduced pressure. The precipitate was collected and dried, yielding 38.4 g. of a brown powder. It showed 50% inhibition of pepsin by adding its 0.10 µg. to the test solution. The supernatant was further evaporated to dryness, yielding 13.0 g. of a brown crude powder. It showed 50% inhibition of pepsin by adding its 0.17 µg. to the test solution. The yield from the culture filtrate to this powder was 70%.

Example 7

Three thousand liters of the medium as described in Example 1 were placed in 6,000 liters fermenter and after sterilization 110 liters of 28 hours cultured broth in 200 liters fermenter as described in Example 3 were inoculated and fermentation was continued under stirring at 190 r.p.m. and under aeration of 2,500 liters of sterile air/minute at 24° C. The broth was harvested at 65 hours of the fermentation. pH was 7.5 and 77.5 kg. of dicalite was added and filtered through filter press and the filter cake was washed with 200 liters of water. The total volume of the beer filtrate and the water used for the washing was 2,790 liters. pH was made 8.2 with 3N NaOH and extracted with 1,400 liters of n-butanol. The test of inhibition of pepsin indicated that the filtrate contained 423 g. of pepstatin and the butanol extract contained 362 g. of pepstatin. The butanol extract was concentrated under reduced pressure to 105 liters and the precipitate was separated (the wet weight of the precipitate was 3,670 g.). The concentrated solution was further concentrated to 10 liters and the precipitate (wet weight 1,540 g.) was collected. The precipitates were combined and dissolved in 16 liters of methanol at about 40° C. The methanol solution contained 297 g. of pepstatin. The active carbon of 1,500 g. was added to the warm methanol solution and filtered. The methanol solution was cooled, then crystals (wet weight 400 g.) appeared and separated. The carbon was washed with hot methanol of 8 liters 3 times and these methanol solutions were added to the supernatant of crystals and concentrated to 1 liter and cooled, yielding 63 g. of crystals of pepstatin.

The mycelium cake containing dikalite was extracted with 500 liters of hot methanol, and the methanol solution was evaporated under vacuum. The residue was washed with 15 liters of hot ethanol and thereafter was dissolved in hot methanol of 20 liters. One thousand g. of carbon was added to the hot methanol and the evaporation of methanol to 1 liter and the successive cooling precipitated crystals of pepstatin (170 g.).

Example 8

Pepstatin (548 mg.) was dissolved in about 50 ml. of methanol, an ether solution containing diazomethane at 3g./200 ml. was added until yellow color of diazomethane remain. Immediately thereafter it was evaporated under vacuum, yielding 560 mg. of white powder. The recrystallization from methanol yielded white needle crystals, m.p. 249–251° C. It shows ester band at 1730 cm.$^{-1}$ in the infrared spectrum and in this crystal band at 1710 cm.$^{-1}$ which is the carboxyl band in pepstatin disappeared. Addition of 0.015 µg. of this ester to the test solution showed 50% inhibition.

Example 9

One loopful amount spores and mycelium of the strain MC210–Al were inoculated to a medium containing glycerol 2.5%, meat extract 0.5%, peptone 0.5%, yeast extract 1.0%, NaCl 0.2%, $MgSO_4 \cdot 7H_2O$ 0.05%, $K_2HPPO_4$ 0.05% and $CaCO_3$ O.32%. Hundred ml. of this medium was placed in a shaking flask of 500 ml. of volume and sterilized before inoculation. It was shake-cultured at 27° C. for 7 days. pH was 7.5 on the fifth day and 7.7 on the seventh day. Addition of 0.1 ml. of the 25 times diluted culture filtrate to the test solution showed 32% inhibition of pepsin. The culture filtrates of 50 flasks were combined and the combined filtrate pepstatin in the combined filtrate was extracted with 2,000 liters of n-butanol. The evaporation under reduced pressure of the extract yielded 2.0 g. of a brown powder. Addition of its 1.5 µg. to the test solution showed 50% inhibition of pepsin. The crude powder was suspended in 30 ml. of water and passed through a column of carbon (18 g., 1.5 cm. in diameter). Three hundred ml. of 30% aqueous methanol was passed and thereafter pepstatin on the column was eluted with 80% aqueous methanol. The eluate was collected in fractions, each weighing 5 g. Pepstatin appeared in fractions of No. 28–45. These fractions were combined and evaporated under vacuum, yielding 0.35 g. of white powder which showed 50% inhibition of pepsin by adding 0.3 µg. to the test solution. The purification of pepstatin in this powder by the same method described in Example 4 gave crystals of pepstatin which was identified by the infrared spectrum and the thin layer chromatography.

Example 10

By the similar procedure shown in Example 9, instead of the strain MC210–Al, the strain MC284–Cl was shake-cultured. pH was 6.2 on the third day and 7.8 on the seventh day. When 0.05 ml. of 50 times dilute culture filtrate was added to the test solutions, 29% inhibition of pepsin was observed. From 3,000 ml. of the culture filtrate, pepstatin was extracted into n-butanol of 1,500 ml. and the evaporation under vacuum yielded 1.5 g. Addition of 0.35 µg. of this powder to the test solution showed 50% inhibition of pepsin. The thin layer chromatography showed the same spot as pepstatin. Five mg. was crystallized from the thin layer chromatogram and the identity with pepstatin was confirmed by the infrared spectrum and the biological activity.

Example 11

One hundred fourteen mg. of pepstatin was dissolved in 40 ml. of ethanol and refluxed with 40 ml. of benzene and several drops of conc. sulfuric acid for 4 hours. It was neutralized with sodium bicarbonate, and after the filtration the filtrate was concentrated under reduced pressure to dry, yielding 75 mg. of white powder. This powder was washed with water and dried, yielding 48 mg. of ethyl ester of pepstatin. m.p. 190–193° C. Calcd. for $C_{36}H_{67}N_5O_9$: C, 60.56, H, 9.45, N, 9.80, O 20.16; found: C, 60.96, H, 9.65, N, 9.43, O 19.70. Addition of 0.02 µg. to the test solution showed 50% inhibition of pepsin.

Example 12

Four hundred five mg. of methyl ester of pepstatin was dissolved in methanol and ammonium gas was introduced for 14 hours. During this reaction the precipitate appeared and the filtration after the reaction gave 324 mg. of white powder of pepstatin amide which was contaminated with methyl ester of pepstatin. This powder was subjected to silica gel chromatography using chloroformacetone-methanol (5:3:2 in volume) and fractions were cut into each 5 g. Pepstatin amide appeared in fractions No. 101–350, evaporation of which gave 260 mg. of pure pepstatin amide. M.p. 229–231° C. Anal.: calcd. for $C_{34}H_{64}N_6O_8$: C, 59.62, H, 9.41, N, 12.27, O18.68; found: C, 59.69, H, 9.45, N, 12.17, O 18.24. Addition of 0.054 μg. to test solution showed 50% inhibition of pepsin.

Included within the scope of this invention are pepstatin, addition salts of pepstatin with inorganic bases and organic bases such as sodium, potassium, ammonia, calcium, magnesium glucosamine, mannosamine, galactosamine, ferrous, ferric, cupric, cuprous etc. and esters of pepstatin such as methyl, ethyl, propyl, butyl, isobutyl, pentyl, isopentyl, benzyl esters, etc. For therapeutic purposes, salts from nontoxic bases are useful but salts with toxic bases are useful in isolation procedures e.g. as precipitants from the solutions.

When desired for specific purposes and rendered pharmaceutically compatible, there may be admixed the compounds of present invention with other medicaments such as antihistamines, sulfa drugs, antibiotics, buffering agents such as sodium bicarbonate, calcium carbonate, aluminum silicate, magnesium carbonate etc. nerve-blocking agents such as methochropromide, oxazepam etc.

What we claim is:

1. A pepsin inhibitor designated pepstatn, effective n inhibiting pepsin, but not effective in inhibiting trypsin, plasmin and papain, effective in protections of stomach ulcer of pylorus ligated rats, useful for treatment of peptic ulcer, said pepstatin being a substance which is soluble in methanol, ethanol, acetic acid, pyridine and dimethylsulfoxide, slightly or insoluble in ethyl acetate, ether, benzene, chloroform and water, which exhibits no absorption maximum of ultraviolet light from 220 mμ to 350 mμ, which gives positive reactions to Rydon-Smith and permanganate and negative reactions to ninhydrin, Sakaguchi and Ehrlich tests, which contains carboxyl group and forms metal salts and esters; further properties of said crystalline pepstatin being that it has the formula $$C_{34}H_{63}N_5O_9,$$

exhibits $[\alpha]_D^{20} = -90°$ (C=0.288 in methanol), melts at 228–229° C. with decomposition, exhibits adsorption bands in the infrared region of the spectrum when pelleted in potassium bromide at the following wave numbers in cm.$^{-1}$: 3320, 3090, 2955, 1635, 1545, 1470, 1450, 1420, 1390, 1370, 1300, 1220, 1178, 1070, 710, yields L-alanine and L-valine in the ratio of 1:2 respectively together with iso-valeric acid and another amino acid which is very weak in ninhydrin reaction, and is shown to have the following structure by isolation of 4 hydrolysis products shown in said structure, and mass spectrometry of permethylated pepstatin methyl ester:

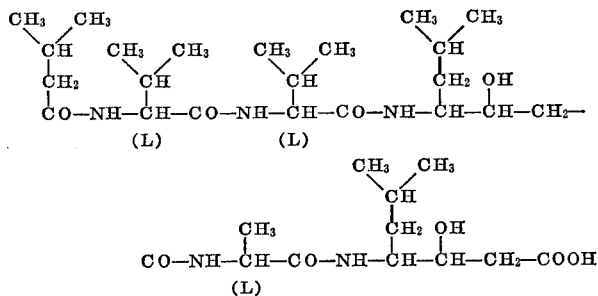

2. Lower alkyl esters of pepstatin as defined in claim 1.

References Cited

UNITED STATES PATENTS 3,629,404   12/1971   Florent et al. _____ 424—117

OTHER REFERENCES

Umezawa et al., J. of Antibiotics (Japan), 23, 259 (1970).

Morishima et al., J. of Antibiotics (Japan), 23 263 (1970).

Aoyagi et al. J. of Antibiotics (Japan), 22, 283 (1969).

Aoyagi et al., J. of Antibiotics (Japan), 22, 558 (1969).

Fieser and Fieser, "Reagents for Organic Synthesis," Wiley and Sons, N.Y., vol. I, p. 1309, vol. II, p. 475, vol. III, p. 351.

LEWIS GOTTS, Primary Examiner

R. J. SUYAT, Assistant Examiner

U.S. Cl. X.R.

195—12, 32, 42, 65; 424—177